United States Patent [19]
Carobbi et al.

[11] Patent Number: 4,937,294
[45] Date of Patent: Jun. 26, 1990

[54] STABLE BORON RESINS OF HIGH SELECTIVE ABSORBENT POWER

[75] Inventors: Renato Carobbi, Pistoia; Franco Innocenti, Bagno a Ripoli, both of Italy

[73] Assignee: SIRAC Srl, Italy

[21] Appl. No.: 171,447

[22] Filed: Mar. 21, 1988

[30] Foreign Application Priority Data

Apr. 3, 1987 [IT] Italy .................. 19965 A/87

[51] Int. Cl.$^5$ .................. C08F 8/00
[52] U.S. Cl. .................. 525/329.7; 525/330.3; 525/337; 526/239
[58] Field of Search .................. 525/329.7, 337; 526/239

[56] References Cited

U.S. PATENT DOCUMENTS

| | | | |
|---|---|---|---|
| 3,663,659 | 5/1972 | Kray et al. | 525/337 |
| 4,355,140 | 10/1982 | Manziek | 525/337 |
| 4,506,036 | 3/1985 | Filippini et al. | 521/149 |
| 4,542,161 | 9/1985 | Filippini et al. | 521/149 |

FOREIGN PATENT DOCUMENTS 0085836 8/1983 European Pat. Off.
0159521 10/1985 European Pat. Off.

Primary Examiner—Bernard Lipman
Attorney, Agent, or Firm—Arnold, White & Durkee

[57] ABSTRACT

Stable boron resins of high selective absorbent power and their production process. Said boron resins consist of a polyacrylic matrix functionalized with quaternary ammonium groups, an epoxy group and phenylboric groups in accordance with general formula (I):

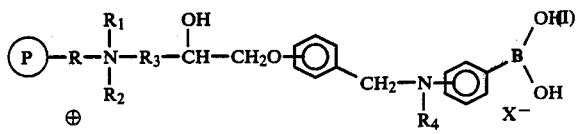

in which $\text{P}$, $R_1$, $R_2$, $R_3$, $R_4$ and $X^-$ are as defined in the text.

The resins are prepared by reacting an amine resin with an epihalohydrin and condensing the reaction product with a suitable boroxin.

The resins of formula (I) can be used for separating sugars, in particular for purifying lactulose. They have greater selective power than currently known boron resins.

1 Claim, No Drawings

STABLE BORON RESINS OF HIGH SELECTIVE ABSORBENT POWER

This invention relates to new boron resins possessing very high selective absorbent power which are stable in organic solvents and in aqueous acid and alkaline solutions.

More particularly, the invention relates to boron resins consisting of an acrylic polymer matrix functionalised with quaternary ammonium groups, an epoxy group and phenylboric groups, of general formula (I):

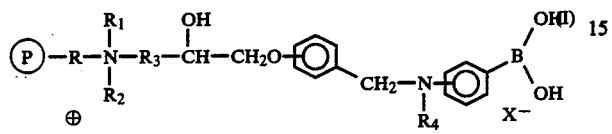

in which:
- (P) the polyacrylic matrix
- R is $-(CH_2)_n-$ where n varies between 0 and 5
- $R_1$ and $R_2$ which can be the same or different, are $C_1-C_5$ alkyl
- $R_3$ is $-(C_nH_{2n})$ where n varies from 1 to 5
- $R_4$ is H or $C_1-C_5$ alkyl
- $X^-$ is an anion chosen from halogens and hydroxyl.

The invention also relates to a process for producing the resins defined by general formula (I).

In European Patent No. 85102934.8 we have already described boron resins with a polyacrylic matrix bifunctionalised with quaternary ammonium groups and alkylphenylboric groups, which possess good chemical and mechanical stability characteristics and can be used in industrial processes, they having a marked selective absorbent action particularly in separating lactulose !rom its mixtures with other carbohydrates, generally lactose and galactose.

It has now been discovered that boron resins with further improved selectivity in separating sugars can be obtained by the process of the present invention, which is described in detail hereinafter.

The boron resins of the present invention are prepared from a polyacrylic resin obtained by cross-linking an acrylic ester with divinylbenzene and preferably having the following characteristics:

| | |
|---|---|
| Percentage of cross-linkage | 4% |
| Mean pore diameter | 1100 Å |
| Specific surface area | 10 m²/g |
| Particle size | 0.2–0.4 mm (90%) |

This resin is firstly subjected to a transamination reaction by reacting with disubstituted diamines by known methods.

Separately, a particular boroxin of the type corresponding to the indicated formula is obtained by reacting an aminophenylboroxin of formula

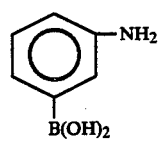

with hydroxybenzaldehyde, to produce an Intermediate of formula (II)

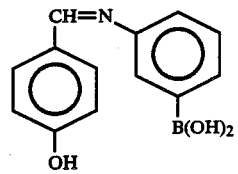

To produce the boron resin, either:

(1) the transaminated polyacrylic resin is firstly reacted with an epihalohydrin:

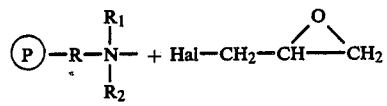

and the product of this reaction reacted with the boroxin (II):

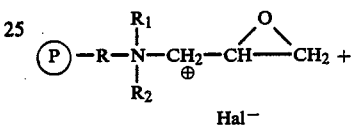

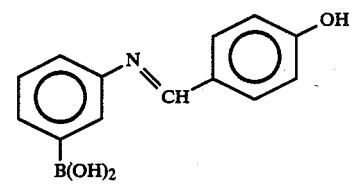

to give

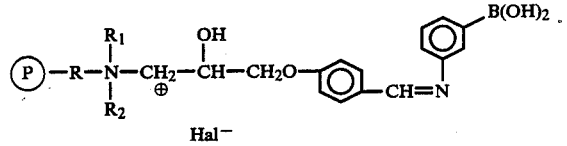

and then

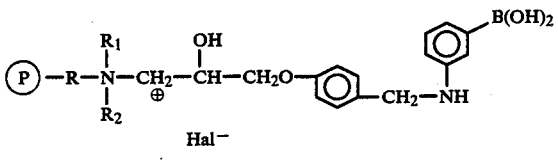

or:

(2) the boroxin (II) is firstly reacted with the epihalohydrin and the product of this reaction reacted with the transaminated polyacrylic resin, the product of this latter reaction then being reduced by NaBH in methanol, to obtain a product of formula (I):

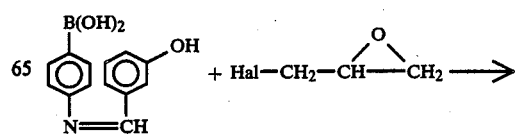

-continued

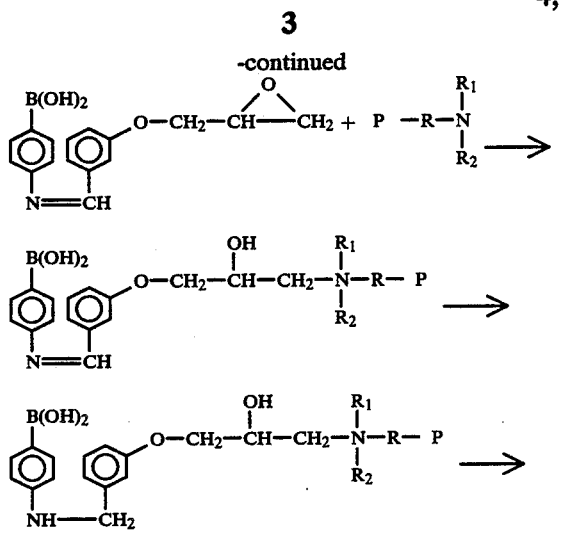

The preferred conditions for implementing the individual steps of the process in the form of the two alternatives described schematically heretofore are as follows:

(a) Transamination of the polyacrylic matrix: this is conducted by known methods, as shown in U.S. Pat. No. 4,506,036, (equivalent to European No. 85102934.8 mentioned on page 1), reacting the polyacrylic matrix with a disubstituted diamine.

(b) Preparation of the boroxin of formula (II): a substituted benzeneboronic acid such as an aminobenzeneboronic or oxybenzeneboronic acid is fixed with p-oxybenzaldehyde in an alcoholic solvent, and left at ambient temperature for 15–24 hours. The crude product can be used for the subsequent reactions after filtration.

(c) Reaction of the transaminated polyacrylic resin with an epihalohydrin: the aminated acrylic resin is pretreated by a process comprising regeneration in Cl⁻ form by reaction with a dilute NaCl and HCl solution at about ambient temperature, washing with demineralized water until neutral, regeneration in OH⁻ form by treatment in aqueous ammonia at around ambient temperature, washing with demineralised water until neutral, washing with acetone and drying under vacuum.

At this point the resin is placed in a polar aprotic solvent such as dioxane, and heated under reflux with epichlorohydrin dissolved in the same solvent, triggering the reaction with potassium iodide and heating under reflux between 40° and 200°C. for 15–25 hours. After filtration and repeated washes with the same solvent, the crude product is ready for the subsequent reactions.

(d) Reaction of the product obtained in (c) with the boroxin of formula (II) followed by reduction: this process is conducted by suspending the product obtained in (c) in a polar aprotic solvent such as dioxane, then adding the product obtained in (b). The suspension is kept at ambient temperature for 15–30 hours under agitation. It is filtered and the product taken up in alcohol. The suspension is treated with NaBH for 8–12 hours at a temperature of about 10°–20° C.

After filtration, the resin is washed repeatedly by kneading with ethanol and with a mixture of ethanol and dilute hydrochloric acid, and finally with dilute hydrochloric acid alone.

(e) Reaction of the boroxin of formula (II) with the epihalohydrin: the crude product obtained in (b) is dissolved in the epihalohydrin and the mixture heated at 30°–50° C. for 15–24 hours. The excess epihalohydrin is then distilled off at reduced pressure at a temperature not exceeding 50° C.

The residue is taken up in alcohol and left under agitation under cold conditions for some hours.

The mixture is filtered under reduced pressure to recover the required product.

(f) reaction of the product obtained in (e) with the aminated acrylic resin followed by reduction: the aminated acrylic resin, pretreated as described in (c) above, is placed in a solvent of the type used in (d), such as dioxane, a product such as that obtained in (e); is added, the reaction triggered with potassium iodide and the mixture heated under reflux at a temperature of between 40° and 80° C. for 15–25 hours.

It is then filtered through a Buchner funnel and the residue obtained ia taken up in alcohol. It is then reduced with NaBH and purazine as indicated for the step described in (d) above.

Some practical embodiments of the processes and resin of the present invention are given hereinafter in order to make the processes and resin more easily reproducible.

EXAMPLE 1

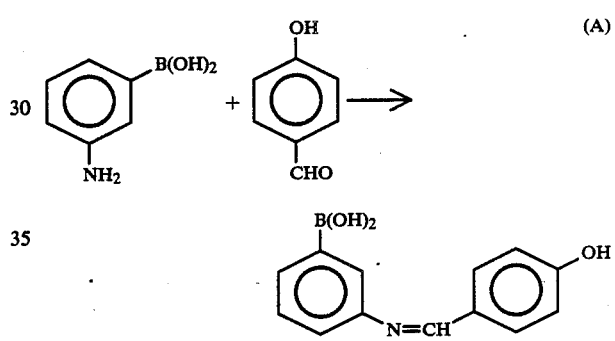

25 g of m-aminobenzeneboronic acid are dissolved in 200 ml of ethanol. 32 g of p-oxybenzaldehyde dissolved in 150 ml of the same solvent are then added.

The mixture is left to stand at ambient temperature for 18 hours

On termination, the product obtained (40 g) is filtered off. The product is used crude in the subsequent reactions.

EXAMPLE 2

(a) Preparation of the epoxy resin from the aminated acrylic resin 45 g of acrylo-amine resin obtained by known methods are subjected to the following sequence of operations:

the resin is regenerated in Cl⁻ form by treatment with 130 ml of an NaCl solution of 100 g/l concentration at a temperature of 20° C. for 60 minutes; the regeneration is completed by treatment with 150 ml of a 10% HCl solution at a temperature of 20° C. for 40 minutes;

the resin is washed with demineralised water until neutral;

the resin is regenerated in OH⁻ form by treatment with 200 ml of an NH₃ solution of 40 g/l concentration at a temperature of 20° C. for a time of 90 minutes;

The resin is washed with demineralised water until neutral;

it is washed with acetone and dried by heating under vacuum to 55° C. for 8 hours;

200 ml of dioxane are added to the resin and the resin left in dioxane at ambient temperature for 24 hours.

40 g of the resin treated in this manner, corresponding to 160 ml, are fed into a glass flask fitted with a reflux condenser, a CaCl₂ tube, thermometer and mechanical agitator.

20 of epichlorohydrin dissolved in 500 ml of dioxane and 20 g of KI are then added. The mixture is suitably agitated and kept at 5° C. for 24 hours.

On termination of the reaction, the mixture is filtered through a Buchner funnel and washed by mashing three times with 500 ml of dioxane followed by filtration in succession.

The product is used crude for the next reaction.

(b); Resin condensation and reduction. The crude epoxy resin from the previous reaction is taken up in 1000 ml of dioxane. 65 g of the product obtained in Example 1 are then added.

The suspension is kept at ambient temperature for 24 hours under agitation. On termination of the reaction the mixture is filtered through a Buchner funnel and the resin obtained is taken up in 1000 ml of ethanol.

The suspension is placed in a flask fitted with an agitator and 8 g of NaBH₄ are added, the mixture then being kept under agitation at 10°-15° C. for 8 hours.

On termination of the reaction the mixture ia filtered through a Buchner funnel and then washed by three successive mashing and filtration operations, namely a first mashing in 250 ml of ethanol, a second mashing in 250 ml of an ethanol/0.5 N HCl mixture in a 2/1 volume ratio, and finally a third mashing in 300 ml of 0.2 N HCl.

| degree of functionalisation | 3.5 meq of B per gram of dry resin |
| --- | --- |
| percentage of cross-linkage | 4% |
| pore diameter | 1000 Å |
| specific surface area | 19 m²/g |
| apparent density | 0.8 g/ml |
| real density | 1.45 g/ml |
| particle size | 0.2–0.4 mm (75%) |

EXAMPLE 3

(a) Reaction of the aminated resin obtained in Example 1 with epichlorohydrin.

40 g of crude product obtained in Example 1 are dissolved in 200 ml of epichlorohydrin.

The mixture is heated to 35°-40° C. for 18 hours.

On termination, the excess solvent ia distilled off under vacuum while maintaining the temperature less than 45° C.

The residue is taken up in 150 ml o: methanol and kept under agitation under cold conditions for 2 hours.

It ia filtered under vacuum to obtain 35 g of the required product.

The product ia crystallised from methylene chloride.

(b) Reaction of the Product obtained in (a) with the amine resin. The acrylo-amine resin is suitably pretreated as described in the aforesaid Example 2.

20 g of the resin pretreated in this manner, corresponding to 80 ml, are placed in a glass flask fitted with a reflux condenser, a CaCl₂ tube, thermometer and mechanical agitator. 600 ml of dioxane, 42 g of the product obtained under point (b); and 10 g of KI are then added. The mixture is agitated, heated to 50° C. and kept under these conditions for 24 hours.

On termination of the reaction, the mixture is filtered through a Buchner funnel and the residue obtained is taken up in 500 ml of ethanol.

The suspension is placed in a flask fitted with an agitator and 4 g of NaBH₄ are added, the mixture then being kept under agitation at 10°-15° C. for 8 hours.

On termination of the reaction the mixture is filtered through a Buchner funnel and then washed by three successive mashing and filtering operations, namely a first mashing in 250 ml of ethanol, a second mashing in 250 of an ethanol/0.5 N HCl mixture in a 2/1 volume ratio, and finally a third mashing in 300 ml of 0.2 N HCl.

31 g of resin are obtained having the same characteristics as the resin obtained in Example B.

EXAMPLE 4

A boron resin of the characteristics of example 2b is rehydrated in deionised water for 8 hours.

100 cc of this resin are placed in a 26 mm diameter column and fed for 60 minutes with 50 cc of a lactulose syrup solution (lactulose 50% by weight, lactose 4% by weight, galactose 4.5% by weight, other sugars 7% by weight) diluted 1 to 2 with deionised water and alkalinised to give a final solution of pH 8. By elution with a mobile phase of the same pH, 190 cc of a solution are obtained containing 26 g of unretained sugars, comprising:

| lactulose | 21 g |
| --- | --- |
| lactose | 2.4 g |
| galactose | 2.6 g |

The column is then eluted with a 1 N HCl solution to obtain 150 cc of a lactose-free solution containing:

| lactulose | 11 g |
| --- | --- |
| galactose | 0.2 g |

We claim:

1. Boron resins of general formula (I):

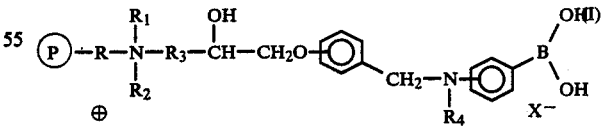

in which
P is a polyacrylic matrix
R is —(CH₂)ₙ— where n lies between 0 and 5
R₁ and R₂, which can be the same or different, are C₁–C₅ alkyl
R₃ is —(CₙH₂ₙ) where n varies from 1 to 5
R₄ is H or C₁–C₅ alkyl
X— is an anion chosen from halogens and hydroxyl.

* * * * *

UNITED STATES PATENT AND TRADEMARK OFFICE
CERTIFICATE OF CORRECTION

PATENT NO. : 4,937,294

DATED : June 26, 1990

INVENTOR(S) : Renato CAROBBI et al.

It is certified that error appears in the above-identified patent and that said Letters Patent is hereby corrected as shown below:

TITLE PAGE

In section [73] Assignee:, change "SIRAC Srl, Italy" to -- INALCO Spa, Italy--.

Signed and Sealed this

Seventeenth Day of March, 1992

Attest:

HARRY F. MANBECK, JR.

*Attesting Officer* — Commissioner of Patents and Trademarks